(12) United States Patent
Sawakami et al.

(10) Patent No.: US 11,225,109 B2
(45) Date of Patent: Jan. 18, 2022

(54) TYRE

(71) Applicant: Sumitomo Rubber Industries, Ltd., Kobe (JP)

(72) Inventors: Isao Sawakami, Kobe (JP); Rena Onitsuka, Kobe (JP); Yuan Suxiang, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 355 days.

(21) Appl. No.: 16/361,883

(22) Filed: Mar. 22, 2019

(65) Prior Publication Data

US 2019/0308467 A1    Oct. 10, 2019

(30) Foreign Application Priority Data

Apr. 6, 2018  (JP) .............................. JP2018-074053
Apr. 6, 2018  (JP) .............................. JP2018-074054
Apr. 6, 2018  (JP) .............................. JP2018-074055

(51) Int. Cl.
  *B60C 11/12*  (2006.01)
  *B60C 11/03*  (2006.01)

(52) U.S. Cl.
  CPC ........ *B60C 11/125* (2013.01); *B60C 11/0304* (2013.01); *B60C 11/1236* (2013.01);
  (Continued)

(58) Field of Classification Search
  CPC ................... B60C 11/125; B60C 11/11; B60C 2011/0381; B60C 2011/0362;
  (Continued)

(56) References Cited

U.S. PATENT DOCUMENTS

2012/0285592 A1    11/2012  Kameda
2017/0253086 A1    9/2017   Sanae
                   (Continued)

FOREIGN PATENT DOCUMENTS

EP    1859962 A1    11/2007
EP    3213931 A1    9/2017
              (Continued)

OTHER PUBLICATIONS

JP 2015157600 Machine Translation; Hayashi Koji (Year: 2015).*
(Continued)

*Primary Examiner* — Robert C Dye
*Assistant Examiner* — Nicholas J Weiler
(74) *Attorney, Agent, or Firm* — Birch, Stewart, Kolasch & Birch, LLP

(57) ABSTRACT

A tyre includes a tread portion provided with circumferentially extending main grooves and land portions. The main grooves include an outboard crown main groove, and an inboard crown main groove. The land portions include a crown land portion defined between the outboard crown main groove and the inboard crown main groove. The crown land portion is provided with first crown sipes having first ends connected to the outboard crown main groove and second ends terminating within the crown land portion, and second crown sipes having first ends connected to the inboard crown main groove and second ends terminating within the crown land portion, wherein the first crown sipes are inclined with respect to a tyre axial direction in a same direction as the second crown sipes, and the first crown sipes and the second crown sipes are different in angle with respect to the tyre axial direction.

20 Claims, 4 Drawing Sheets

(52) U.S. Cl.
CPC . *B60C 2011/036* (2013.01); *B60C 2011/0348* (2013.01); *B60C 2011/0358* (2013.01); *B60C 2011/0362* (2013.01); *B60C 2011/0381* (2013.01); *B60C 2011/0383* (2013.01)

(58) Field of Classification Search
CPC . B60C 11/1281; B60C 11/0304; B60C 11/12; B60C 2011/1254; B60C 2011/1236; B60C 2011/0383
See application file for complete search history.

(56) References Cited

U.S. PATENT DOCUMENTS

| | | |
|---|---|---|
| 2017/0282651 A1 | 10/2017 | Suzuki et al. |
| 2017/0368888 A1* | 12/2017 | Wakasugi ............. B60C 11/125 |
| 2018/0126790 A1 | 5/2018 | Muhlhoff et al. |

FOREIGN PATENT DOCUMENTS

| | | | | |
|---|---|---|---|---|
| EP | 3260309 A1 | | 12/2017 | |
| JP | 2015157600 A | * | 9/2015 | ......... B60C 11/0332 |
| JP | 2016113003 A | * | 6/2016 | ......... B60C 11/1218 |
| JP | 2016150601 A | * | 8/2016 | ......... B60C 11/0332 |
| JP | 2017071373 A | * | 4/2017 | ......... B60C 11/1218 |
| JP | 2017-154710 A | | 9/2017 | |
| WO | WO 2016/177973 A1 | | 11/2016 | |

OTHER PUBLICATIONS

JP 2016113003 Machine Translation; Kubota Masataka (Year: 2016).*
JP 2016150601 Machine Translation; Nagase Hiroki (Year: 2016).*
JP 2017071373 Machine Translation; Kikuchi Hiroshi (Year: 2017).*
Extended European Search Report dated Jun. 7, 2019 for European Application No. 19162881.7.

* cited by examiner

TYRE

BACKGROUND ART

Field of the Disclosure

The present disclosure relates to tyres, more particularly to a tyre capable of improving steering stability and wet performance.

Description of the Related Art

Conventionally, tyres which includes treads provided with circumferentially extending main grooves have been known. This kind of tyres has been required not only steering stability but also wet performance. For example, the following Patent document 1 discloses a tyre which includes a tread portion having a designated mounting direction to a vehicle, wherein steering stability and wet performance can be compatible by enhancing stiffness of a tread outboard region.

Patent Document

[Patent document 1] Japanese Unexamined Patent Application Publication 2017-154710

SUMMARY OF THE DISCLOSURE

However, a demand for tyres is being increased year by year, and thus further improvement in the tyre disclosed by Patent document 1 has been required.

The present disclosure has been made in view of the above circumstances and has a major object to provide tyres capable of improving steering stability and wet performance in a high level.

According to one aspect of the disclosure, a tyre includes a tread portion having a designated mounting direction to a vehicle, the tread portion being provided with circumferentially extending main grooves and land portions divided by the main grooves. The main grooves include an outboard crown main groove, and an inboard crown main groove that is located toward a vehicle inner side with respect to the outboard crown main groove when the tyre is mounted to a vehicle. The land portions include a crown land portion defined between the outboard crown main groove and the inboard crown main groove. The crown land portion is provided with first crown sipes having first ends connected to the outboard crown main groove and second ends terminating within the crown land portion, and second crown sipes having first ends connected to the inboard crown main groove and second ends terminating within the crown land portion, wherein the first crown sipes are inclined with respect to a tyre axial direction in a same direction as the second crown sipes, and the first crown sipes and the second crown sipes are different in angle with respect to the tyre axial direction.

In another aspect of the disclosure, angles of the first crown sipes with respect to the tyre axial direction may be smaller than angles of the second crown sipes with respect to the tyre axial direction.

In another aspect of the disclosure, the crown land portion may further be provided with crown shallow grooves having groove depths of less than 2 mm, and the crown shallow grooves may connect the second ends of the first crown sipes and the second ends of the second crown sipes.

In another aspect of the disclosure, the crown shallow grooves may be inclined in a same direction as the first crown sipes with respect to the tyre axial direction.

In another aspect of the disclosure, lengths in the tyre axial direction of the second crown sipes may be smaller than lengths in the tyre axial direction of the first crown sipes.

In another aspect of the disclosure, the crown land portion may further be provided with shallow grooves having groove depths of less than 2 mm, wherein the first crown sipes may be provided on bottom portions of the shallow grooves.

In another aspect of the disclosure, the main grooves may include an outboard shoulder main groove located a vehicle outer side with respect to the outboard crown main groove when the tyre is mounted to a vehicle, the land portions may include an outboard middle land portion defined between the outboard crown train groove and the outboard shoulder main groove, the outboard middle land portion may be provided with first outboard middle sipes having first ends connected to the outboard crown main groove and second ends terminating within the outboard middle land portion, and the first outboard middle sipes may be continuous smoothly to the first crown sipes through the outboard crown main groove.

In another aspect of the disclosure, the first outboard middle sipes, with respect to the tyre axial direction, may be inclined in a same direction as the first crown sipes.

In another aspect of the disclosure, the outboard middle land portion may further be provided with shallow grooves having groove depths of less than 2 mm, wherein the first outboard middle sipes may be provided on bottom portions of the shallow grooves.

In another aspect of the disclosure, the outboard middle land portion may further be provided with second outboard middle sipes having first ends connected to the outboard shoulder main groove and second ends terminating within the outboard middle land portion, wherein the first outboard middle sipes and the second outboard middle sipes may be arranged alternately in a tyre circumferential direction.

In another aspect of the disclosure, the second outboard middle sipes, with respect to the tyre axial direction, may be inclined in a same direction as the first outboard middle sipes.

In another aspect of the disclosure, lengths in the tyre axial direction of the second outboard middle sipes may be smaller than lengths in the tyre axial direction of the first outboard middle sipes.

In another aspect of the disclosure, the outboard middle land portion may further be provided with shallow grooves having groove depths of less than 2 mm, wherein the second outboard middle sipes may be provided on bottom portions of the shallow grooves.

In another aspect of the disclosure, the main grooves may include an inboard shoulder main groove located a vehicle inner side with respect to the inboard crown main groove when the tyre is mounted to a vehicle, the land portions may include an inboard middle land portion defined between the inboard crown main groove and the inboard shoulder main groove, the inboard middle land portion may be provided with first inboard middle sipes having first ends connected to the inboard crown main groove and second ends terminating within the inboard middle land portion, and the first inboard middle sipes may be continuous smoothly to the second crown sipes through the inboard crown main groove.

In another aspect of the disclosure, the inboard middle land portion may further be provided with second inboard middle sipes having first ends connected to the inboard shoulder main groove and second ends terminating within the inboard middle land portion, wherein the first inboard middle sipes and the second inboard middle sipes may be arranged alternately in a tyre circumferential direction.

In another aspect of the disclosure, the second inboard middle sipes, with respect to the tyre axial direction, may be inclined in a same direction as the first inboard middle sipes.

In another aspect of the disclosure, the inboard middle land portion may further be provided with middle shallow grooves having groove depths of less than 2 mm, and the middle shallow grooves may connect the second ends of the first inboard middle sipes and the second ends of the second inboard middle sipes.

In another aspect of the disclosure, the middle shallow grooves, with respect to the tyre axial direction, may be inclined in an opposite direction to the first inboard middle sipes.

In another aspect of the disclosure, lengths in the tyre axial direction of the second inboard middle sipes may be greater than lengths in the tyre axial direction of the first inboard middle sipes.

In another aspect of the disclosure, the inboard middle land portion may further be provided with shallow grooves having groove depths of less than 2 mm, wherein the first inboard middle sipes may be provided on bottom portions of the shallow grooves.

DESCRIPTION OF THE PREFERRED EMBODIMENTS

An embodiment of the present disclosure will be explained below with reference to the accompanying drawings.

Figure 1:
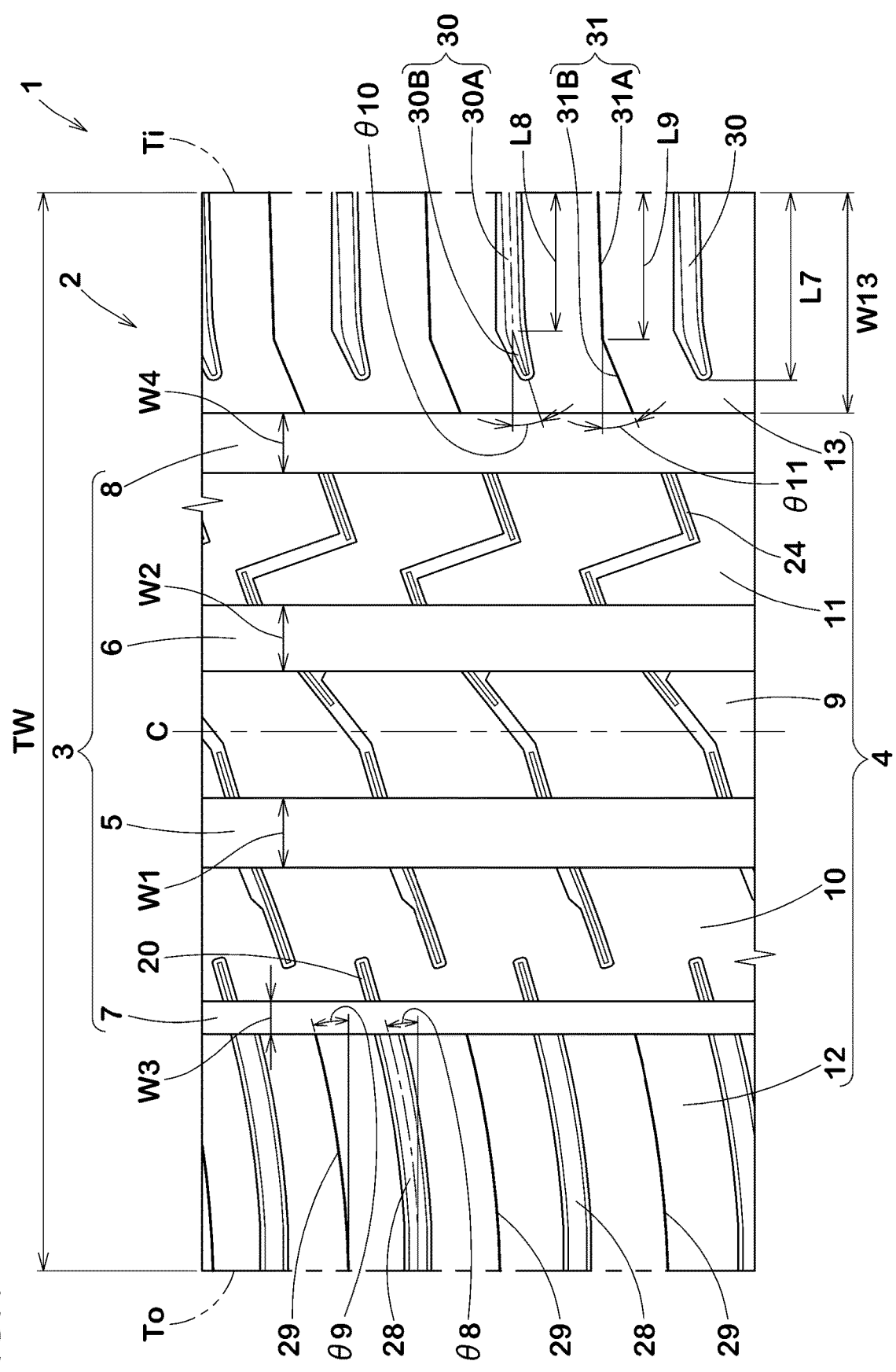
FIG. 1 is a development view of a tread portion according to an embodiment of the disclosure.

FIG. 1 illustrates a development view of a tread portion 2 of a tyre 1 according to an embodiment of the disclosure.

The tyre 1 according to the present disclosure can be used for various kinds of tyres, e.g., pneumatic tyres for passenger car and heavy-duty vehicle, and non-pneumatic tyres that can support the tyre load by structural members without being inflated with a pressurized air. The tyre 1 according to the present embodiment, for example, may be used for a passenger car tyre having a nominal tyre section width of 205 mm or more suitably.

As illustrated in FIG. 1, the tyre 1 according to the present embodiment includes the tread portion 2 having a designated mounting direction to a vehicle. The tread portion 2, when being mounted to a vehicle, includes an outboard tread edge To located toward a vehicle outer side and an inboard tread edge Ti located toward a vehicle inner side. The designated mounting direction to a vehicle, for example, may be indicated using letters or a mark on a tyre sidewall portion (not illustrated).

When the tyre 1 is a pneumatic tyre, the respective tread edges To and Ti are defined as axially outermost edges of the ground contacting patch of the tread portion 2 which occurs under a normal state with a standard tyre load when the camber angle of the tyre is zero. As used herein, the normal state is such that the tyre 1 is mounted on a standard wheel rim with a standard pressure but is loaded with no tyre load. Unless otherwise noted, dimensions of respective portions of the tyre 1 are values measured under the normal state.

The standard wheel rim is a wheel rim officially approved for each tyre by standards organizations on which the tyre is based, wherein the standard wheel rim is the "standard rim" specified in JATMA, the "Design Rim" in TRA, and the "Measuring Rim" in ETRTO, for example.

The standard pressure is a standard pressure officially approved for each tyre by standards organizations on which the tyre is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

The standard tyre load is a tyre load officially approved for each tyre by standards organizations in which the tyre is based, wherein the standard tyre load is the "maximum load capacity" in JATMA, the maximum value given in the above-mentioned table in TRA, the "Load Capacity" in ETRTO, for example.

The tread portion 2 includes circumferentially extending main grooves 3, and land portions 4 divided by the main grooves 3. The main grooves 3 have groove widths W1 to W4 equal to or more than 2% of the tread width TW. As used herein, the tread width TW is an axial distance between the outboard tread edge To and the inboard tread edge Ti under the normal state.

The main grooves 3 according to the present embodiment include an outboard crown main groove 5, and an inboard crown main groove 6 that is located toward a vehicle inner side with respect to the outboard crown main groove 5 when the tyre 1 is mounted to a vehicle. The outboard crown main groove 5, for example, extends continuously in the tyre circumferential direction in a straight manner between the tyre equator C and the outboard tread edge To. The inboard crown main groove 6, for example, extends continuously in the tyre circumferential direction in a straight manner between the tyre equator C and the inboard tread edge Ti.

It is preferable that the groove width W1 of the outboard crown main groove 5 is greater than the groove width W2 of the inboard crown main groove 6. The main grooves 3 as such can offer better drainage performance around the tyre equator C, leading to superior wet performance of the tyre 1.

The main grooves 3 according to the present embodiment include an outboard shoulder main groove 7 located toward a vehicle outer side with respect to the outboard crown main groove 5 when the tyre 1 is mounted to a vehicle, and an inboard shoulder main groove 8 located toward a vehicle inner side with respect to the inboard crown main groove 6 when the tyre 1 is mounted to a vehicle. The outboard shoulder main groove 7, for example, extends continuously in the tyre circumferential direction in a straight manner between the outboard crown main groove 5 and the outboard tread edge To. The inboard shoulder main groove 8, for example, extends continuously in the tyre circumferential direction in a straight manner between the inboard crown main groove 6 and the inboard tread edge Ti.

It is preferable that the groove width W3 of the outboard shoulder main groove 7 is smaller than the groove width W4 of the inboard shoulder main groove 8. The main grooves 3 as such can offer better drainage performance around a region between the tyre equator C and the inboard tread edge Ti, leading to superior wet performance of the tyre 1. Further, the main grooves 3 as such may help to enhance stiffness of a region between the tyre equator C and the outboard tread edge To, leading to superior steering stability of the tyre 1.

It is preferable that groove width W4 of the inboard shoulder main groove 8 is smaller than the groove widths W2 of the inboard crown main groove 6. Thus, the groove widths W1 to W4 of the main grooves 3 have the following relation: W1>W2>W4>W3. Preferably, a total groove width (W1+W2+W3+W4) of the main grooves 3 is in a range of from 22% to 28% of the tread width TW. The main grooves 3 can improve wet performance of the tyre 1 and steering stability in a well-balanced manner.

The land portions 4, for example, include a crown land portion 9 defined between the outboard crown main groove 5 and the inboard crown main groove 6. It is preferable that the land portions 4 further include an outboard middle land portion 10 defined between the outboard crown main groove 5 and the outboard shoulder main groove 7, and an inboard middle land portion 11 defined between the inboard crown main groove 6 and the inboard shoulder main groove 8. The land portions 4 further include an outboard shoulder land portion 12 defined between the outboard shoulder main groove 7 and the outboard tread edge To, and an inboard shoulder land portion 13 defined between the inboard shoulder main groove 8 and the inboard tread edge Ti.

Figure 2:
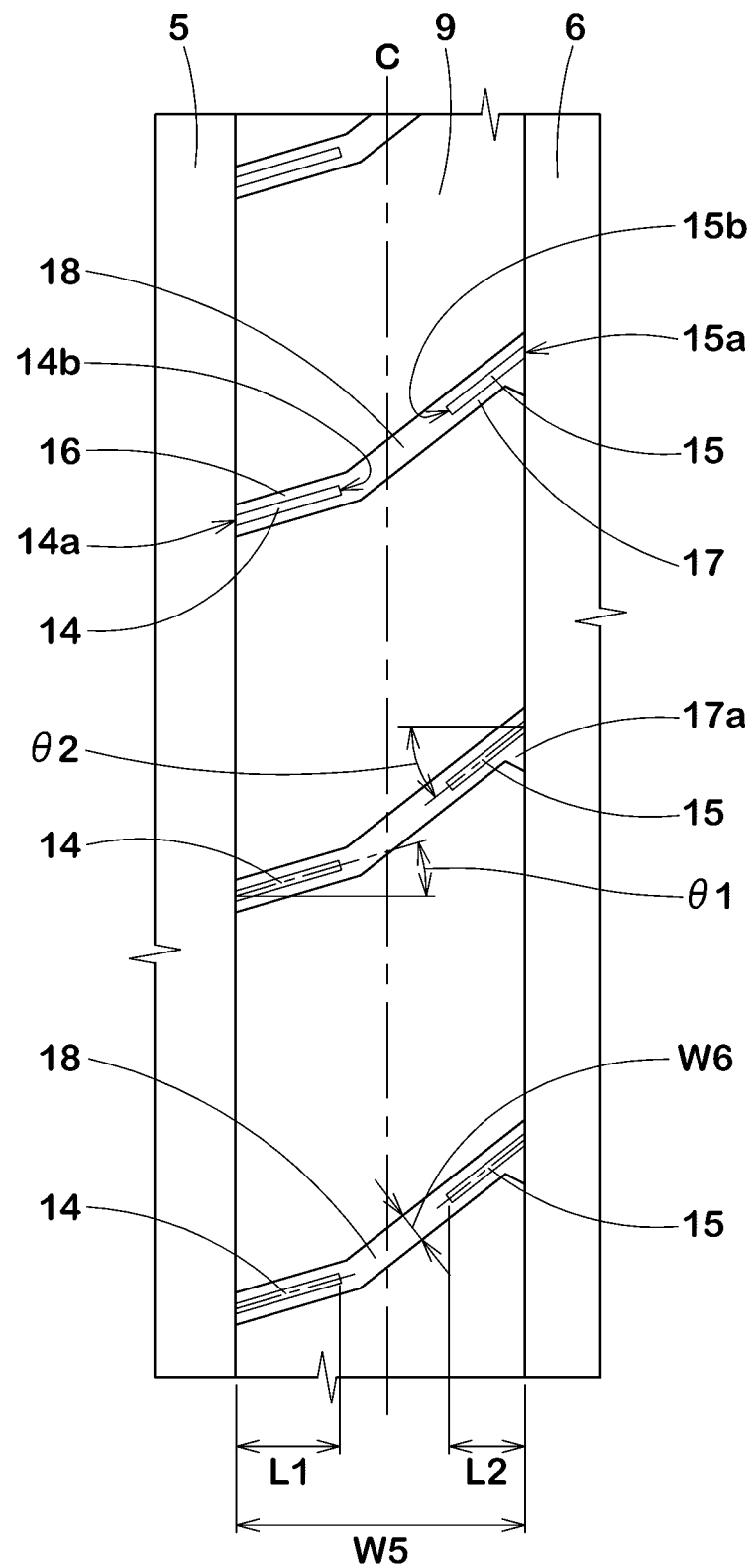
FIG. 2 is an enlarged view of a crown land portion.

FIG. 2 illustrates an enlarged view of the crown land portion 9. As illustrated in FIG. 2, the crown land portion 9 according to the present embodiment is provided with first crown sipes 14 having first ends 14a connected to the outboard crown main groove 5, and second crown sipes 15 having first ends 15a connected to the inboard crown main groove 6. The first crown sipes 14 and the second crown sipes 15 are incisions that preferably have widths of less than 1.5 mm.

Preferably, the first crown sipes 14 have second ends 14b which are terminated within the crown land portion 9. Preferably, the second crown sipes 15 have second ends 15b which are terminated within the crown land portion 9. In the present embodiment, the first crown sipes 14 and the second crown sipes 15 are arranged alternately in the tyre circumferential direction. Thus, the first crown sipes 14 and the second crown sipes 15 can improve drainage performance while maintaining sufficient stiffness of the crown land portion 9.

The first crown sipes 14 according to the present embodiment, with respect to the tyre axial direction, are inclined in the same direction as the second crown sipes 15. Preferably, the first crown sipes 14 are different in inclination angle from the second crown sipes 15. The crown land portion 9 which is provided with the first crown sipes 14 and the second crown sipes 15 may enhance stiffness of a region of the tread portion 2 on the vehicle inner side. Further the crown land portion 9 may improve drainage performance of a region of the tread portion on the vehicle outer side. The tyre 1 according to the present embodiment can improve steering stability and wet performance in a high level.

Preferably, the first crown sipes 14 are inclined at angles θ1 in a range of from 15 to 30 degrees with respect to the tyre axial direction. Preferably, the second crown sipes 15 are inclined at angles θ2 in a range of from 30 to 45 degrees with respect to the tyre axial direction. It is preferable that the angles θ1 of the first crown sipes 14 are smaller than the angles θ2 of the second crown sipes 15. Such first crown sipes 14 as well as second crown sipes 15 can further improve wet performance of the tyre 1.

Preferably, the first crown sipes 14 have lengths L1 in the tyre axial direction in a range of from 25% to 45% of a width W5 of the crown land portion 9. Preferably, the second crown sipes 15 have lengths L2 in the tyre axial direction in a range of from 20% to 40% of the width W5 of the crown land portion 9.

Preferably, the lengths L2 in the tyre axial direction of the second crown sipes are smaller than the lengths L1 in the tyre axial direction of the first crown sipes 14. Thus, the first crown sipes 14 which are to be located toward a vehicle outer side and are longer than the second crown sipes 15 can generate powerful torque, improving steering stability and wet performance of the tyre 1 in a high level.

In this embodiment, the crown land portion 9 is further provided with shallow grooves 16 having groove depths of less than 2 mm, and the first crown sipes 14 are provided on bottom portions of the shallow grooves 16. Further, the crown land portion 9 is further provided with shallow grooves 17 having groove depths of less than 2 mm, and the second crown sipes 15 are provided on bottom portions of the shallow grooves 17. Note that the first crown sipes 14 and the second crown sipes 15 are not limited to the above aspect but can be modified in such a manner that these sipes extend directly on a ground contact surface of the crown land portion 9. Preferably, the first crown sipes 14 and the second crown sipes 15 have depths in a range of from 5 to 7 mm from the ground contact surface of the crown land portion 9.

In this embodiment, the shallow grooves 17 which are provided with the second crown sipes 15 are provided with chamfer portions. The chamfer portions are located on first ends 17a connected to the inboard crown main groove 6. Thus, the second crown sipes 15 tend to open moderately at the first ends 15a side, improving wet performance of the tyre 1.

In this embodiment, the crown land portion 9 is further provided with crown shallow grooves 18 having groove depths of less than 2 mm, and the crown shallow grooves 18 connect the second ends 14b of the first crown sipes 14 and the second ends 15b of the second crown sipes 15. Preferably, the crown shallow grooves 18 are inclined in the same direction as the first crown sipes 14 with respect to the tyre axial direction. The crown shallow grooves 18, for example, are inclined at angles same as the angles θ2 of second crown sipes 15.

In this embodiment, the crown shallow grooves 18 are in communication with the shallow grooves 16 provided with the first crown sipes 14 and the shallow grooves 17 provided with the second crown sipes 15. Preferably, the crown shallow grooves 18 have groove widths W6 which are substantially same as the groove widths of the shallow grooves 16 and 17. It is noted that the above-mentioned "substantially same" shall include aspects of not only the same groove width but also a plus/minus 10% difference between groove widths.

The groove widths W6 of the crown shallow grooves 18 are preferably of from 2 to 5 mm. Such crown shallow grooves 18 can improve drainage performance while maintaining stiffness of the crown land portion 9, improving steering stability and wet performance of the tyre in a well-balanced manner.

In this embodiment, the crown land portion 9 is not provided with any grooves that have groove widths equal to or more than 3 mm and that have groove depths equal to or more than 2 mm. Thus, the crown land portion 9 can exhibit high stiffness, improving steering stability of the tyre 1.

Figure 3:
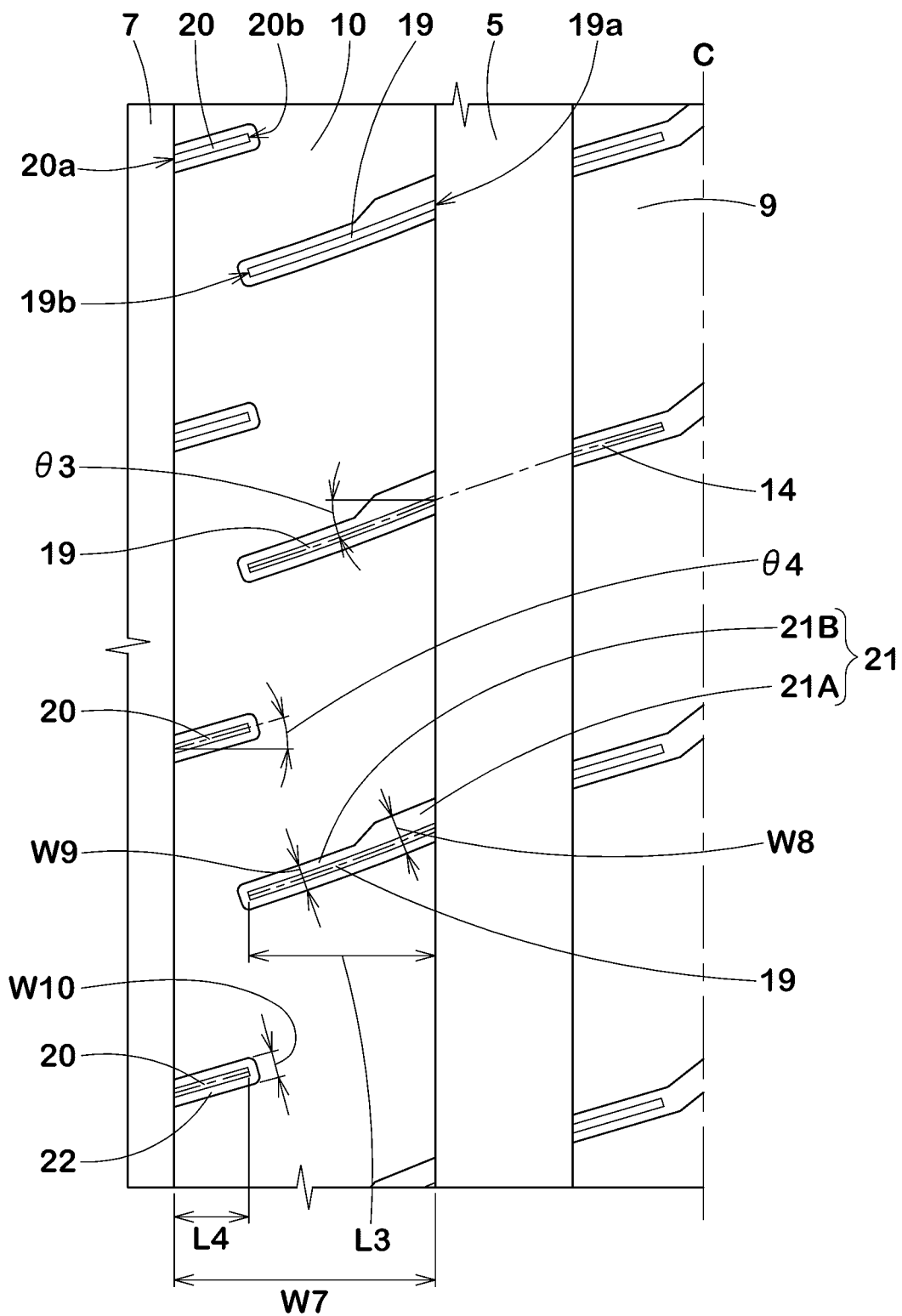
FIG. 3 is an enlarged view of an outboard middle land portion.

FIG. 3 illustrates an enlarged view of the outboard middle land portion 10. As illustrated in FIG. 3, the outboard middle land portion 10 is provided with first outboard middle sipes 19 having first ends 19a connected to the outboard crown main groove 5 and second outboard middle sipes 20 having first ends 20a connected to the outboard shoulder main groove 7. The first outboard middle sipes 19 and the second outboard middle sipes 20 are incisions that preferably have widths of less than 1.5 mm.

Preferably, the first outboard middle sipes 19 have second ends 19b which are terminated within the outboard middle land portion 10. Preferably, the second outboard middle sipes 20 have second ends 20b which are terminated within the outboard middle land portion 10. In this embodiment, the first outboard middle sipes 19 and the second outboard middle sipes 20 are arranged alternately in the tyre circumferential direction. The second ends 19b of the first outboard middle sipes 19, for example, may be located outwardly in the tyre axial direction with respect to the second ends 20b of the second outboard middle sipes 20. The first outboard middle sipes 19 and the second outboard middle sipes 20 can improve wet performance of the tyre 1 while maintaining stiffness of the outboard middle land portion 10.

In this embodiment, the first outboard middle sipes 19 are inclined in the same direction as the first crown sipes 14 with respect to the tyre axial direction. Further, the second outboard middle sipes 20 according to the present embodiment are inclined in the same direction as the first outboard middle sipes 19 with respect to the tyre axial direction. Preferably, the second outboard middle sipes 20 are arranged in substantially parallel with the first outboard middle sipes 19. Note that the above-mentioned "substantially parallel" shall include aspects of not only parallel but also a plus/minus 5-degree angle difference between sipes.

The first outboard middle sipes 19 preferably have angles θ3 in a range of from 15 to 30 degrees with respect to the tyre axial direction. Further, the second outboard middle sipes 20 preferably have angles θ4 in a range of from 15 to 30 degrees with respect to the tyre axial direction. The first outboard middle sipes 19 and the second outboard middle sipes 20, when traveling on wet roads, generate friction in tyre circumferential and axial directions in a well-balanced manner, improving wet performance of the tyre 1.

In this embodiment, the first outboard middle sipes 19 and the second outboard middle sipes 20 respectively have lengths L3 and L4 which are different from one another. Preferably, the lengths L4 in the tyre axial direction of the second outboard middle sipes 20 are smaller than the lengths L3 in the tyre axial direction of the first outboard middle sipes 19. Thus, the first outboard middle sipes 19 which are to be located toward a vehicle inner side and are longer than the second outboard middle sipes 20 can generate powerful torque, improving steering stability and wet performance of the tyre 1 in a high level.

Preferably, the lengths L3 in the tyre axial direction of the first outboard middle sipes 19 are in a range of from 65% to 80% of a width W7 of the outboard middle land portion 10. Such first outboard middle sipes 19, in corporation with the outboard crown main groove 5, are helpful to exhibit superior wet performance of the tyre 1.

Preferably, the lengths L4 in the tyre axial direction of the second outboard middle sipes 20 are in a range of from 20% to 35% of the width W7 of the outboard middle land portion 10. Such second outboard middle sipes 20 can maintain stiffness of the outboard middle land portion 10, and are helpful to exhibit superior steering stability of the tyre 1.

In this embodiment, the outboard middle land portion 10 is further provided with shallow grooves 21 and 22 having groove depths of less than 2 mm. Preferably, the first outboard middle sipes 19 are provided on bottom portions of the shallow grooves 21. Further, preferably, the second outboard middle sipes 20 are provided on bottom portions of the shallow grooves 22. Note that the first outboard middle sipes 19 as well as the second outboard middle sipes 20 are not limited to the above embodiment but can be provided directly on a ground contact surface of the outboard middle land portion 10. The first outboard middle sipes 19 and the second outboard middle sipes 20 have depths of 5 to 7 mm from the ground contact surface of the outboard middle land portion 10.

In this embodiment, each shallow groove 21 which is provided with one first outboard middle sipe 19 includes a first shallow groove portion 21A having a groove width W8 and a second shallow groove portion 21B having a groove width W9 narrower than the groove width W8. The groove width W9 of second shallow groove portion 21B is preferably in a range of from 60% to 80% of the groove width W8 of the first shallow groove portions 21A. Thus, each first outboard middle sipe 19 tends to open moderately at the first end 19a side, improving wet performance of the tyre 1.

Preferably, the shallow grooves 22 which are provided with the second outboard middle sipes 20 have groove widths W10 substantially equal to the groove widths W9 of the second shallow groove portions 21B. Preferably, the groove widths W10 of the shallow grooves 22 are in a range of from 2 to 5 mm. Such shallow grooves 22 can improve drainage performance while maintaining stiffness of the outboard middle land portion 10, improving steering stability and wet performance of the tyre 1 in a well-balanced manner.

Preferably, the respective first outboard middle sipes 19 are continuous smoothly to the respective first crown sipes 14 through the outboard crown main groove 5. As used herein, "continuous smoothly" shall include an aspect that when the respective two sipes are expanded along the respective longitudinal directions to the main groove therebetween, the extended sipes cross with each other in the main groove. Such a tyre having the first outboard middle sipes 19 and the first crown sipes 14 can drainage smoothly when coming into contact with the ground, while providing better stiffness distribution. Thus, steering stability and wet performance can be improved in a well-balanced manner.

In this embodiment, the outboard middle land portion 10 is not provided with any grooves that have groove widths equal to or more than 3 mm and that have groove depths equal to or more than 2 mm. Thus, the outboard middle land portion 10 can exhibit high stiffness, improving steering stability of the tyre 1.

Figure 4:
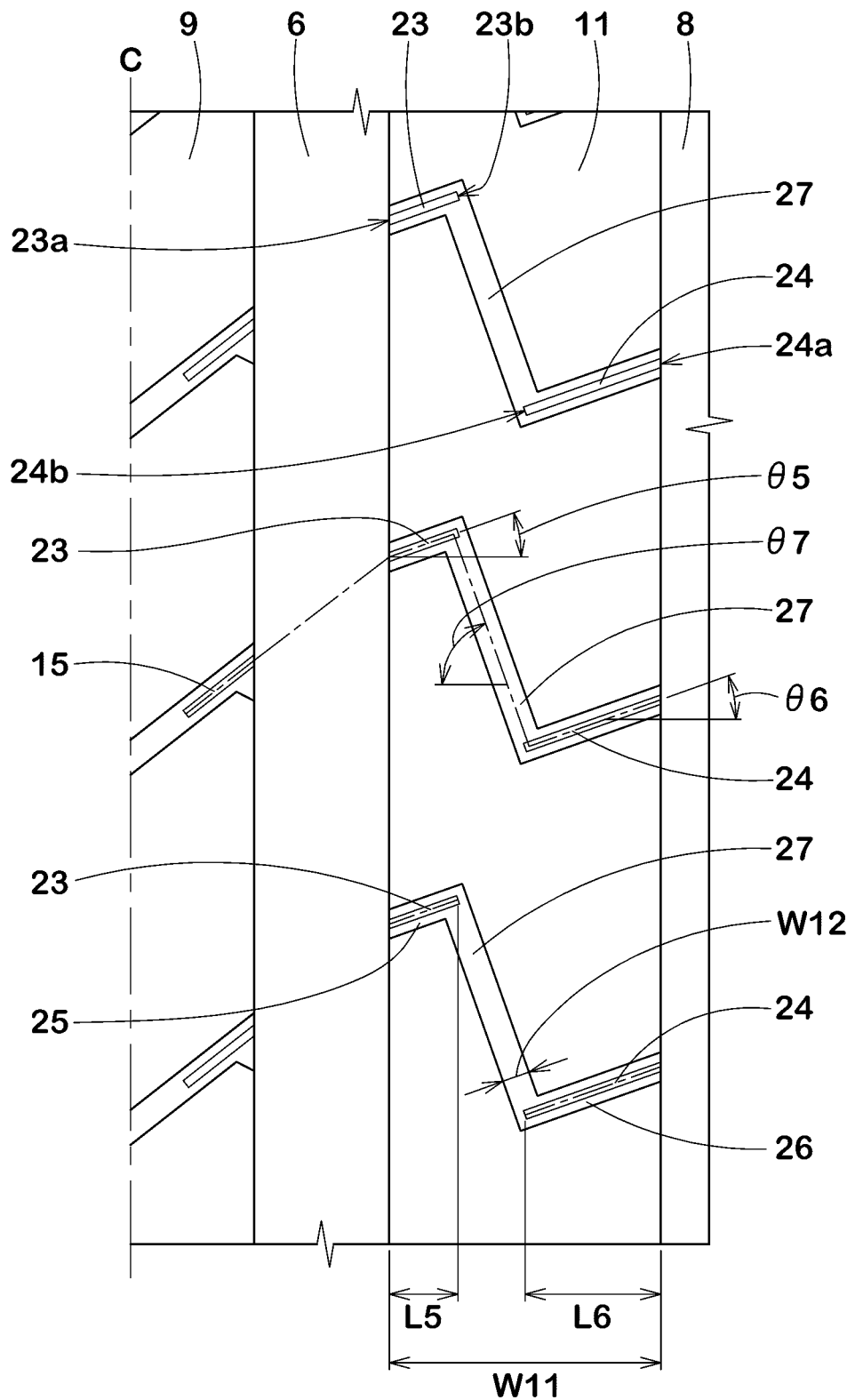
FIG. 4 is an enlarged view of an inboard middle land portion.

FIG. 4 illustrates an enlarged view of the inboard middle land portion 11. As illustrated in FIG. 4, the inboard middle land portion 11 is provided with first inboard middle sipes 23 having first ends 23a connected to the inboard crown main groove 6, and second inboard middle sipes 24 having first ends 24a connected to the inboard shoulder main groove 8. The first inboard middle sipes 23 and the second inboard middle sipes 24 are incisions that preferably have widths of less than 1.5 mm.

Preferably, the first inboard middle sipes 23 have second ends 23b which are terminated within the outboard middle land portion 10. Preferably, the second inboard middle sipes 24 have second ends 24b which are terminated within the outboard middle land portion 10. In this embodiment, the first inboard middle sipes 23 and the second inboard middle sipes 24 are arranged alternately in the tyre circumferential direction. The first inboard middle sipes 23 and the second inboard middle sipes 24 may be improve wet performance of the tyre 1 while maintaining stiffness of the inboard middle land portion 11.

In the present embodiment, the first inboard middle sipes 23 are inclined in the same direction as the second crown sipes 15 with respect to the tyre axial direction. Further, the second inboard middle sipes 24 according to the present embodiment are inclined in the same direction as the first inboard middle sipes 23 with respect to the tyre axial direction. Preferably, the second inboard middle sipes 24 and the first inboard middle sipes 23 are in parallel with one another.

Preferably, the first inboard middle sipes 23 each have an angle θ5 in a range of from 15 to 25 degrees with respect to the tyre axial direction. Preferably, the second inboard middle sipes 24 each have an angle θ6 in a range of from 15 to 25 degrees with respect to the tyre axial direction. The first outboard middle sipes 19 and the second outboard middle sipes 20, when traveling on wet roads, generate friction in tyre circumferential and axial directions in a well-balanced manner, improving wet performance of the tyre 1.

In this embodiment, the first inboard middle sipes 23 and the second inboard middle sipes 24 respectively have lengths L5 and L6 in the tyre axial direction which are different from one another. Preferably, the lengths L6 in the tyre axial direction of second inboard middle sipes 24 are greater than the lengths L5 in the tyre axial direction of the first inboard middle sipes 23. The second inboard middle sipes 24 which are to be located toward a vehicle inner side and which are longer than the first inboard middle sipes 23 can generate powerful torque, improving steering stability and wet performance of the tyre 1 in a high level.

Preferably, the lengths L5 in the tyre axial direction of the first inboard middle sipes 23 are in a range of from 20% to 35% of a width W11 of the inboard middle land portion 11. Such first inboard middle sipes 23 can be helpful to exert superior steering stability of the tyre while maintaining stiffness of the inboard middle land portion 11.

Preferably, the lengths L6 in the tyre axial direction of the second inboard middle sipes 24 are in a range of from 40% to 55% of the width W11 of the inboard middle land portion 11. Such second inboard middle sipes 24 can provide proper stiffness distribution of the inboard middle land portion 11 so that tread wear of the tyre 1 progresses uniformly.

In the present embodiment, the first inboard middle sipes 23 is further provided with shallow grooves 25 and 26 having groove depths of less than 2 mm. Preferably, the first inboard middle sipes 23 are provided on bottom portions of the shallow grooves 25. Preferably, the second inboard middle sipes 24 are provided on bottom portions of the shallow grooves 26. The first inboard middle sipes 23 and the second inboard middle sipes 24 are not limited to the above aspect but can be provided directly on a ground contact surface of the inboard middle land portion 11. Preferably, the first inboard middle sipes 23 and the second inboard middle sipes 24 have depths in a range of from 5 to 7 mm from the ground contact surface of the inboard middle land portion 11.

In the present embodiment, the inboard middle land portion 11 is further provided with middle shallow grooves 27 having a depth of less than 2 mm. The middle shallow grooves connect the second ends 23b of the first inboard middle sipes 23 and the second ends 24b of the second inboard middle sipes 24. Preferably, the middle shallow grooves 27, with respect to the tyre axial direction, are inclined in an opposite direction to the first inboard middle sipes 23. Preferably, the middle shallow grooves 27 each have an angle θ7 of from 60 to 80 degrees with respect to the tyre axial direction. Such middle shallow grooves 27 can offer a large friction in the tyre axial direction due to the edges, improving cornering performance of the tyre when traveling on wet roads.

In the present embodiment, the middle shallow grooves 27 are in communication with the shallow grooves 25 provided with first inboard middle sipes 23 and the shallow grooves 26 provided with the second inboard middle sipes 24. The middle shallow grooves 27 have groove widths W12 which are substantially equal to the groove widths W12 of the shallow grooves 25 and 26.

Preferably, the groove widths W12 of middle shallow grooves 27 are in a range of from 2 to 5 mm. Such middle shallow grooves 27 can improve drainage performance while maintaining stiffness of the inboard middle land portion 11, and thus steering stability and wet performance of the tyre 1 can be improved in a well-balanced manner.

Preferably, the first inboard middle sipes 23 are continuous smoothly to the second crown sipes 15 through the inboard crown main groove 6. Such a tyre having the first inboard middle sipes 23 and the second crown sipes 15 can drainage smoothly when coming into contact with the ground, while providing better stiffness distribution. Thus, steering stability and wet performance can be improved in a well-balanced manner.

In the present embodiment, the inboard middle land portion 11 is not provided with any grooves that have groove widths equal to or more than 3 mm and that have groove depths equal to or more than 2 mm. Thus, the inboard middle land portion 11 can exhibit high stiffness, improving steering stability of the tyre 1.

As illustrated in FIG. 1, the outboard shoulder land portion 12, for example, is provided with outboard shoulder lateral grooves 28 and outboard shoulder sipes 29. In the present embodiment, the outboard shoulder lateral grooves 28 and the outboard shoulder sipes 29 are arranged alternately in the tyre circumferential direction.

The outboard shoulder lateral grooves 28, for example, extend axially inwardly from the outboard tread edge To and are in communication with the outboard shoulder main groove 7. Thus, in the present embodiment, the outboard shoulder lateral grooves 28 traverse the outboard shoulder land portion 12 completely.

Preferably, the outboard shoulder lateral grooves 28 are curved smoothly such that angles θ8 thereof with respect to the tyre axial direction gradually increase inwardly in the tyre axial direction. Preferably, the angles θ8 of outboard shoulder lateral grooves 28 are in a range of from 5 to 20 degrees. Such outboard shoulder lateral grooves 28, when traveling on wet roads, can drain water toward the outboard tread edge To, improving wet performance of the tyre 1 further.

The outboard shoulder lateral grooves 28, for example, extend so as to be continuous smoothly to the second outboard middle sipes 20 through the outboard shoulder main groove 7. Such outboard shoulder lateral grooves 28, in cooperation with the second outboard middle sipes 20, can improve wet performance of the tyre 1.

The outboard shoulder sipes 29, for example, extend axially inwardly from the outboard tread edge To, and are in communication with the outboard shoulder main groove 7. Thus, in the present embodiment, the outboard shoulder sipes 29 traverse the outboard shoulder land portion 12 completely.

Preferably, the outboard shoulder sipes 29 are curved smoothly such that angles θ9 thereof with respect to the tyre axial direction gradually increase inwardly in the tyre axial direction. Preferably, the angles θ9 of outboard shoulder sipes 29 are in a range of from 5 to 20 degrees. In the present embodiment, the outboard shoulder sipes 29 extend along (i.e., in parallel with) the outboard shoulder lateral grooves 28. Such outboard shoulder sipes 29 can suppress distortion of the outboard shoulder land portion 12, thereby suppressing uneven wear thereon.

The inboard shoulder land portion 13, for example, is provided with inboard shoulder lateral grooves 30 and inboard shoulder sipes 31. In the present embodiment, the inboard shoulder lateral grooves 30 and the inboard shoulder sipes 31 are arranged alternately in the tyre circumferential direction.

The inboard shoulder lateral grooves 30, for example, extend axially inwardly from the inboard tread edge Ti, and terminate within the inboard shoulder land portion 13. In the present embodiment, the inboard shoulder lateral grooves 30 have lengths L7 in the tyre axial direction in a range of from 75% to 85% of a width W13 of the inboard shoulder land portion 13. Such inboard shoulder lateral grooves 30 can improve steering stability and wet performance of the tyre 1 in a well-balanced manner.

In this embodiment, an axially inner region of the inboard shoulder land portion 13 between a respective one of the inboard shoulder lateral grooves 30 and the inboard shoulder main groove 8 is not provided with any sipes and the like. Thus, the axially inner region of inboard shoulder land portion 13 can surely be enhanced in stiffness.

Each inboard shoulder lateral grooves 30, for example, includes a first groove portion 30A and a second groove portion 30B which are different from one another in angle with respect to the tyre axial direction. The first groove portion 30A, for example, extends in an angle equal to or less than 5 degrees with respect to the tyre axial direction. The second groove portion 30B, for example, is bent with respect to the first groove portion 30A. An angle θ10 of the second groove portion 30B is preferably in a range of from 10 to 20 degrees with respect to the tyre axial direction. Preferably, the first groove portion 30A and the second groove portion 30B have respective groove centerlines which extend in a straight manner. Such inboard shoulder lateral grooves 30 can drain water toward the inboard tread edge Ti, improving wet performance of the tyre 1.

Preferably, lengths L8 in the tyre axial direction of the first groove portion 30A are in a range of from 40% to 60% of the width W13 of the inboard shoulder land portion 13. Such inboard shoulder lateral grooves 30 can suppress uneven wear of the inboard shoulder land portion 13 so that better wet performance of the tyre 1 is maintained over a long period.

Preferably, each second groove portion 30B has a pair of groove edges which extends in a straight manner and which are inclined at an angle with respect to the tyre axial direction. A groove width between the pair of groove edges, for example, decreases gradually inwardly in the tyre axial direction. Such a second groove portion 30B can suppress uneven wear of an inner end portion of the inboard shoulder lateral grooves 30.

The inboard shoulder sipes 31, for example, extend axially inwardly from the outboard tread edge To, and are in communication with the inboard shoulder main groove 8. Thus, in the present embodiment, the outboard shoulder sipes 29 traverse the inboard shoulder land portion 13 completely.

The inboard shoulder sipes 31, for example, extend so as to be continuous smoothly to the second inboard middle sipes 24 through the inboard shoulder main groove 8. Thus, the inboard shoulder sipes 31 tend to open easily, generating high friction upon traveling on wet roads.

Each inboard shoulder sipe 31, for example, includes a first sipe element 31A and a second sipe element 31B which are different from one another in angle with respect to the tyre axial direction. The first sipe element 31A, for example, extends in an angle equal to or less than 5 degrees with respect to the tyre axial direction. The second sipe element 31B, for example, is bent with respect to the first sipe element 31A. Preferably, an angle θ11 of the second sipe element 31B is in a range of from 15 to 25 degrees with respect to the tyre axial direction. Preferably, each of the first sipe element 31A and the second sipe element 31B extends in a straight manner.

In the present embodiment, lengths L9 in the tyre axial direction of the first sipe elements 31A are preferably in a range of from 40% to 50% of the width W13 of the inboard shoulder land portion 13. Such inboard shoulder sipes 31 can help to suppress distortion of a ground contact surface of a central region of the inboard shoulder land portion 13.

While the particularly preferable embodiments in accordance with the present disclosure have been described in detail, the present disclosure is not limited to the illustrated embodiments, but can be modified and carried out in various aspects.

EXAMPLE

Tyres having a basic tread pattern shown in FIG. 1 were prototyped based on the detail shown in Tables 1 to 3. Then, steering stability and wet performance of each test tyres was tested. The common specification and the testing methods for the test tyres are as follows.

Tyre size: 205/55R16
Rim size: 16×6.5JJ
Inner pressure: 230 kPa
Test vehicle: front-wheel-drive car with displacement of 2000 cc
Test tyre location: all wheels
Steering Stability Test:

A test driver drove the test vehicle to which each test tyre was attached on a dry road to evaluate the steering stability by the driver's sense. The test results are shown in Table 1 using an index where Ref. 1 is set to 100. The larger value indicates better the steering stability.

Wet Performance Test

The test vehicle was made to run along a 100-meter radius circle on an asphalt road partially covered with a 5 mm-depth, 20 m-long water pool, and the lateral acceleration (lateral G) during running in the water pool was measured at the front wheels, gradually increasing the speed entering into the water pool, to obtain the average lateral acceleration for the speed range of from 50 to 80 km/h. The results are indicated in table 1 by an index based on Ref.1 being 100, wherein the larger is better.

Tables 1 to 3 show the test results.

TABLE 1

|  | Ref. 1 | Ref. 2 | Ex. 1 | Ex. 2 | Ex. 3 | Ex. 4 | Ex. 5 | Ex. 6 |
|---|---|---|---|---|---|---|---|---|
| Inclination direction of first and second crown sipes | different | same | same | same | same | same | same | same |
| Relation between angles θ1 and θ2 of first and second crown sipes | θ1 < θ2 | θ1 = θ2 | θ1 < θ2 | θ1 > θ2 | θ1 < θ2 | θ< θ2 | θ1< θ2 | θ1 < θ2 |
| First crown sipe lengths L1/crown land portion width W5 (%) | 35 | 35 | 35 | 35 | 20 | 35 | 35 | 35 |
| Second crown sipe lengths L2/crown land portion width W5 (%) | 30 | 30 | 30 | 30 | 30 | 45 | 30 | 30 |
| Crown shallow grooves | presence | presence | presence | presence | presence | presence | none | presence |
| Inclination direction of first crown sipes and the crown shallow grooves | same | same | same | same | same | same | — | different |
| Steering stability (index) | 100 | 96 | 110 | 107 | 108 | 109 | 108 | 107 |
| Wet performance (index) | 100 | 94 | 110 | 104 | 105 | 103 | 102 | 104 |

TABLE 2

|  | Ref. 1 | Ref. 3 | Ex. 7 | Ex. 8 | Ex. 9 | Ex. 10 | Ex. 11 | Ex. 12 |
|---|---|---|---|---|---|---|---|---|
| Relation between first outboard middle sipes and first crown sipes | not continuous | not continuous | continuous | continuous | continuous | continuous | continuous | continuous |
| Relation between first inboard middle sipes and second crown sipes | continuous | not continuous | continuous | not continuous | continuous | continuous | continuous | continuous |
| Second outboard middle sipes | presence | presence | presence | presence | none | presence | presence | presence |
| Second inboard middle sipes | presence | presence | presence | presence | presence | none | presence | presence |
| Crown shallow grooves | presence | presence | presence | presence | presence | presence | none | presence |
| Inclination direction of first crown sipes and crown shallow grooves | same | same | same | same | same | same | — | different |
| Steering stability (index) | 100 | 96 | 110 | 107 | 108 | 109 | 108 | 107 |
| Wet performance (index) | 100 | 94 | 110 | 104 | 105 | 103 | 102 | 104 |

TABLE 3

|  | Ref. 1 | Ref. 4 | Ex. 13 | Ex. 14 | Ex. 15 | Ex. 16 | Ex. 17 | Ex. 18 |
|---|---|---|---|---|---|---|---|---|
| Relation between first inboard middle sipe lengths L5 and second inboard middle sipe lengths L6 | L5 > L6 | L5 > L6 | L5 < L6 | L5 < L6 | L5 < L6 | L5 < L6 | L5 < L6 | L5 < L6 |
| Relation between first outboard middle sipe lengths L3 and second outboard middle sipe lengths L4 | L3 > L4 | L3 < L4 | L3 > L4 | L3 < L4 | L3 > L4 | L3 > L4 | L3 > L4 | L3 > L4 |
| Inclination direction of first inboard middle sipes and second inboard middle sipes | same | same | same | same | different | same | same | same |
| Inclination direction of first outboard middle sipes and second outboard middle sipes | same | same | same | same | same | different | same | same |
| Middle shallow grooves | presence | presence | presence | presence | presence | presence | none | presence |
| Inclination direction of first inboard middle sipes and middle shallow grooves | different | different | different | different | different | different | — | same |
| Steering stability (index) | 100 | 97 | 110 | 107 | 105 | 105 | 105 | 104 |
| Wet performance (index) | 100 | 95 | 110 | 105 | 105 | 106 | 102 | 103 |

From the test results, it is confirmed that the tyres of examples improve steering stability and wet performance in a well-balanced manner compared with the references.

What is claimed is:

1. A tyre comprising:
a tread portion having a designated mounting direction to a vehicle, the tread portion being provided with circumferentially extending main grooves and land portions divided by the main grooves;
the main grooves comprising an outboard crown main groove, and an inboard crown main groove that is located toward a vehicle inner side with respect to the outboard crown main groove when the tyre is mounted to a vehicle;
the land portions comprising a crown land portion defined between the outboard crown main groove and the inboard crown main groove; and
the crown land portion being provided with first crown sipes having first ends connected to the outboard crown main groove and second ends terminating within the crown land portion, and second crown sipes having first ends connected to the inboard crown main groove and second ends terminating within the crown land portion, wherein the first crown sipes are inclined with respect to a tyre axial direction in a same direction as the second crown sipes, the first crown sipes and the second crown sipes are different in angle with respect to the tyre axial direction, the crown land portion is further provided with crown shallow grooves having groove depths of less than 2 mm, the crown shallow grooves connect the second ends of the first crown sipes and the second ends of the second crown sipes, and each crown shallow groove comprises a first element inclined at a same angle as the first crown sipe with respect to the tyre axial direction and a second element inclined at a same angle as the second crown sipe with respect to the tyre axial direction, wherein the first element and the second element are directly connected with each other.

2. The tyre according to claim 1, wherein angles of the first crown sipes with respect to the tyre axial direction are smaller than angles of the second crown sipes with respect to the tyre axial direction.

3. The tyre according to claim 2, wherein the crown shallow grooves are inclined in a same direction as the first crown sipes with respect to the tyre axial direction.

4. The tyre according to claim 1, wherein lengths in the tyre axial direction of the second crown sipes are smaller than lengths in the tyre axial direction of the first crown sipes.

5. The tyre according to claim 1, wherein
the crown land portion is further provided with shallow grooves having groove depths of less than 2 mm, and
the first crown sipes are provided on bottom portions of the shallow grooves.

6. The tyre according to claim 1, wherein
the main grooves comprise an outboard shoulder main groove located toward a vehicle outer side with respect to the outboard crown main groove when the tyre is mounted to a vehicle,
the land portions comprise an outboard middle land portion defined between the outboard crown main groove and the outboard shoulder main groove,
the outboard middle land portion is provided with first outboard middle sipes having first ends connected to the outboard crown main groove and second ends terminating within the outboard middle land portion, and
the first outboard middle sipes are continuous smoothly to the first crown sipes through the outboard crown main groove.

7. The tyre according to claim 6, wherein the first outboard middle sipes, with respect to the tyre axial direction, are inclined in a same direction as the first crown sipes.

8. The tyre according to claim 6, wherein
the outboard middle land portion is further provided with shallow grooves having groove depths of less than 2 mm, and
the first outboard middle sipes are provided on bottom portions of the shallow grooves.

9. The tyre according to claim 6, wherein
the outboard middle land portion is further provided with second outboard middle sipes having first ends connected to the outboard shoulder main groove and second ends terminating within the outboard middle land portion, and
the first outboard middle sipes and the second outboard middle sipes are arranged alternately in a tyre circumferential direction.

10. The tyre according to claim 9, wherein the second outboard middle sipes, with respect to the tyre axial direction, are inclined in a same direction as the first outboard middle sipes.

11. The tyre according to claim 9, wherein lengths in the tyre axial direction of the second outboard middle sipes are smaller than lengths in the tyre axial direction of the first outboard middle sipes.

12. The tyre according to claim 1, wherein
the main grooves comprise an inboard shoulder main groove located toward a vehicle inner side with respect to the inboard crown main groove when the tyre is mounted to a vehicle,
the land portions comprise an inboard middle land portion defined between the inboard crown main groove and the inboard shoulder main groove,
the inboard middle land portion is provided with first inboard middle sipes having first ends connected to the inboard crown main groove and second ends terminating within the inboard middle land portion, and
the first inboard middle sipes are continuous smoothly to the second crown sipes through the inboard crown main groove.

13. The tyre according to claim 12, wherein
the inboard middle land portion is further provided with second inboard middle sipes having first ends connected to the inboard shoulder main groove and second ends terminating within the inboard middle land portion, and
the first inboard middle sipes and the second inboard middle sipes are arranged alternately in a tyre circumferential direction.

14. The tyre according to claim 13, wherein the second inboard middle sipes, with respect to the tyre axial direction, are inclined in a same direction as the first inboard middle sipes.

15. The tyre according to claim 13, wherein
the inboard middle land portion is further provided with middle shallow grooves having groove depths of less than 2 mm, and
the middle shallow grooves connect the second ends of the first inboard middle sipes and the second ends of the second inboard middle sipes.

16. The tyre according to claim 15, the middle shallow grooves, with respect to the tyre axial direction, are inclined in an opposite direction to the first inboard middle sipes.

17. The tyre according to claim 13, wherein lengths in the tyre axial direction of the second inboard middle sipes are greater than lengths in the tyre axial direction of the first inboard middle sipes.

18. The tyre according to claim 12, wherein
the inboard middle land portion is further provided with shallow grooves having groove depths of less than 2 mm, and
the first inboard middle sipes are provided on bottom portions of the shallow grooves.

19. The tyre according to claim 1, wherein the second element is longer than the first element.

20. A tyre comprising:
a tread portion having a designated mounting direction to a vehicle, the tread portion being provided with circumferentially extending main grooves and land portions divided by the main grooves;
the main grooves comprising an outboard crown main groove, and an inboard crown main groove that is located toward a vehicle inner side with respect to the outboard crown main groove when the tyre is mounted to a vehicle;
the land portions comprising a crown land portion defined between the outboard crown main groove and the inboard crown main groove; and the crown land portion being provided with first crown sipes having first ends connected to the outboard crown main groove and second ends terminating within the crown land portion, and second crown sipes having first ends connected to the inboard crown main groove and second ends terminating within the crown land portion, wherein the first crown sipes are inclined with respect to a tyre axial direction in a same direction as the second crown sipes, the first crown sipes and the second crown sipes are different in angle with respect to the tyre axial direction, the crown land portion is further provided with crown shallow grooves having groove depths of less than 2 mm, the crown shallow grooves connect the second ends of the first crown sipes and the second ends of the second crown sipes, lengths in the tyre axial direction of the second crown sipes are smaller than lengths in the tyre axial direction of the first crown sipes, the crown land portion is further provided with first shallow grooves and second shallow grooves having groove depths of less than 2 mm, the first crown sipes are provided on bottom portions of the first shallow grooves, the first shallow grooves are inclined at a same angle as the first crown sipes with respect to the tyre axial direction, the second crown sipes are provided on bottom portions of the second shallow grooves, the second shallow grooves are inclined at a same angle as the second crown sipes with respect to the tyre axial direction, the crown shallow grooves comprise
- first elements inclined at a same angle as the first crown sipes with respect to the tyre axial direction and connected to the respective first shallow grooves, and
- second elements inclined at a same angle as the second crown sipes with respect to the tyre axial direction and connected to the respective second shallow grooves, so that axially adjacent first, crown and second shallow grooves form continuous shallow grooves, and in each continuous shallow groove, an axial length of sum of the second shallow groove and the second element is longer than an axial length of sum of the first shallow groove and the first element.

\* \* \* \* \*